UNITED STATES PATENT OFFICE.

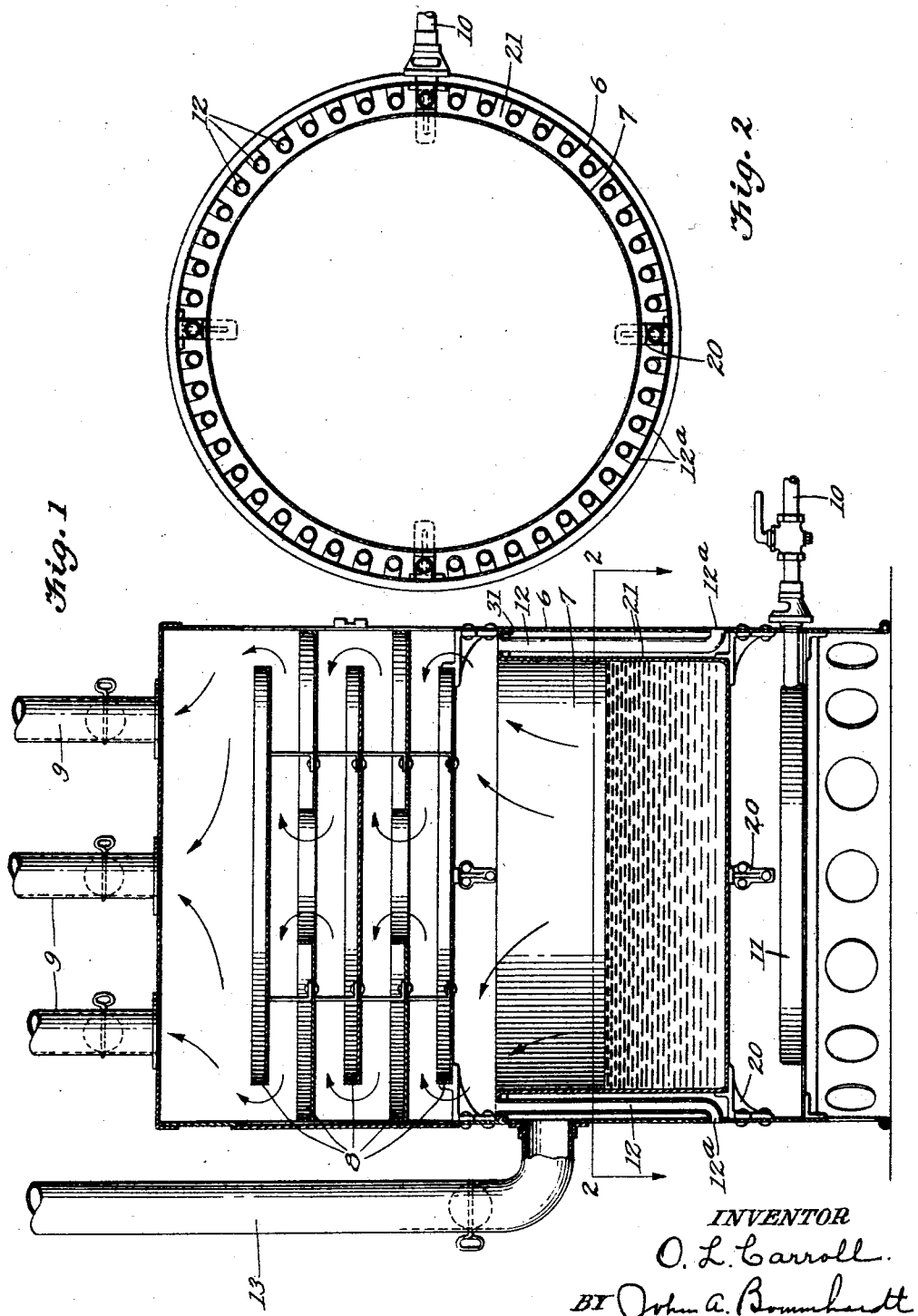

OWEN L. CARROLL, OF CLEVELAND, OHIO.

HEATING APPARATUS FOR VAPOR-BATH DEVICES.

1,410,164.   Specification of Letters Patent.   Patented Mar. 21, 1922.

Application filed April 26, 1921. Serial No. 464,731.

*To all whom it may concern:*

Be it known that I, OWEN L. CARROLL, a citizen of the United States, residing at Cleveland, in the county of Cuyahoga and State of Ohio, have invented certain new and useful Improvements in Heating Apparatus for Vapor-Bath Devices, of which the following is a specification.

This invention is a heating apparatus particularly adapted for use in connection with so-called vapor bath devices by means of which vapor, medicated or otherwise, is supplied to a patient. The apparatus is also capable of use for disinfecting or fumigating purposes, and the principal object of the invention is to produce a vaporizer or heater of the type referred to in which the products of combustion from the burner are not mixed with the vapor produced, so that the patient is not exposed to the fuel gases or products of combustion. This will be found to avoid some of the objections incident to other types of apparatus.

In the accompanying drawings Fig. 1 is a vertical section of the apparatus. Fig. 2 is a section on the line 2—2 of Fig. 1.

Referring specifically to the drawings, 6 indicates an outer shell or casing within which is a tank or vessel 7 for containing liquid to be vaporized, this tank being supported by brackets 20 at the bottom, and being spaced from the wall of the device as indicated at 21. Above the tank, and within the casing, are a series of pans or trays 8 which are spaced from each other and constructed and supported in staggered relation, so as to form a tortuous passage. The medical substance or disinfectant which is to be used is placed in these trays, so that its vapors may mix with the vapors rising from the tank 7. 9 are outlet pipes at the top of the heater for conveying the medicated vapors to the booths or other places where the bath is to be administered or the vapors applied.

Under the boiler or tank 7 is a burner 11 supplied by a gas pipe 10. As stated, the tank 7 is spaced from the wall 6, and in this space a series of vertical air pipes 12 are provided, having inlet openings 12ª at the bottom, in the wall of the casing, and outlets at the top into the space above the tank, the top of the space 21 being closed by an annular partition or ring 31 through which the upper ends of the pipes 12 open. A flue 13 leads from the space 21 to any suitable outlet or stack.

It will be seen that the gases of combustion do not mix with the vapors arising from the boiler, but are conducted off through the flue 13. Air enters through the tubes 12 and becomes highly heated by products of combustion in the annular space 21, and this air flows into the upper part of the casing where it mixes with the steam and other vapors therein, the mixture then being supplied through a pipe 9 to the points of local application. Hence the apparatus will be free from defects incident to the mixture of noxious gases with the medicated vapors, and also the heat will be effectively utilized for the intended purposes.

I claim:

1. A vaporizer comprising an outer casing having a delivery pipe at the top thereof, a tank in the casing spaced from the side walls thereof, a burner under the tank, a plurality of air pipes extending through said space and delivering into the casing above the tank, said space being closed at the top to prevent delivery of products of combustion into the casing above the tank, and a gas outlet from said space.

2. A vaporizer comprising a casing having a delivery pipe at the top, a tank in the lower part of the casing and spaced from the wall thereof, trays supported in the upper part of the casing, a burner under the tank, and a series of air pipes extending through said space and discharging into the casing above the tank, said space being closed at the top to prevent flow of gases of combustion into the casing above the tank, and an outlet for products of combustion from said space.

3. A vaporizer comprising an outer cylindrical casing having an outlet pipe at the top, a burner in the bottom of the casing, a tank in the casing above the burner, said tank being surrounded by a space between the side wall of the tank and the side wall of the casing, said space being closed at the top, a series of air pipes extending vertically through said space and having inlets at their lower ends through the side wall of the casing and outlets at their upper end into the casing above the tank, and an outlet for gases of combustion from the upper part of said space.

In testimony whereof, I do affix my signature in presence of two witnesses.

OWEN L. CARROLL.

Witnesses:
 JOHN A. BOMMHARDT,
 BESSIE F. POLLAK.